Dec. 8, 1953 E. R. BERGMANN 2,661,834
SHAKER CONVEYER
Filed June 9, 1951 3 Sheets-Sheet 1

Inventor
Ernst R. Bergmann
by Murray A. Gleeson
Attorney

Dec. 8, 1953
E. R. BERGMANN
2,661,834
SHAKER CONVEYER
Filed June 9, 1951
3 Sheets-Sheet 2
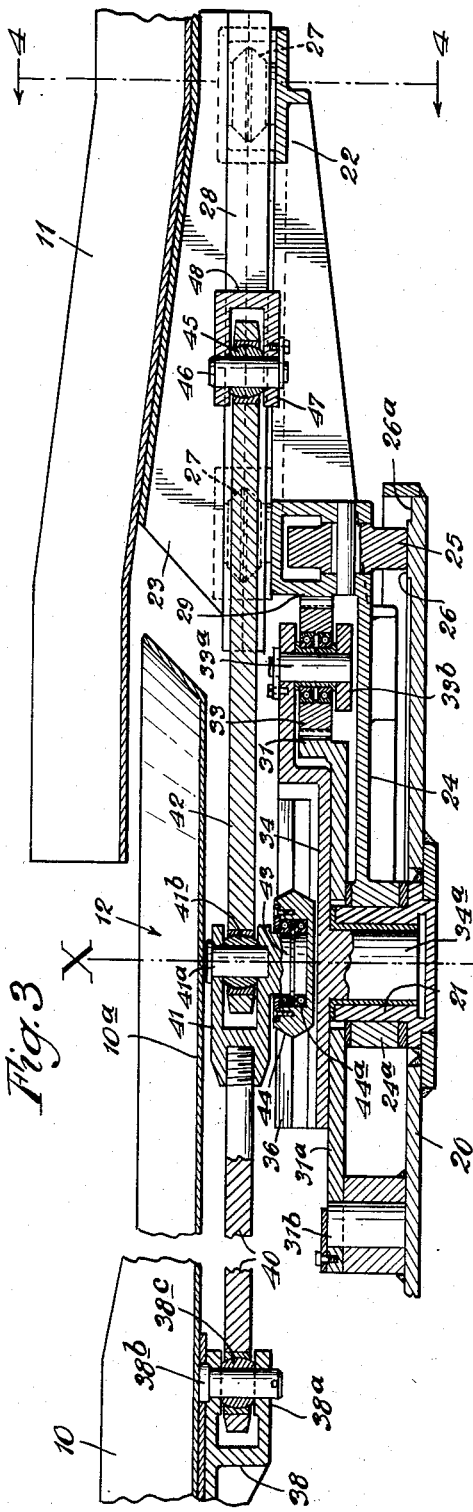
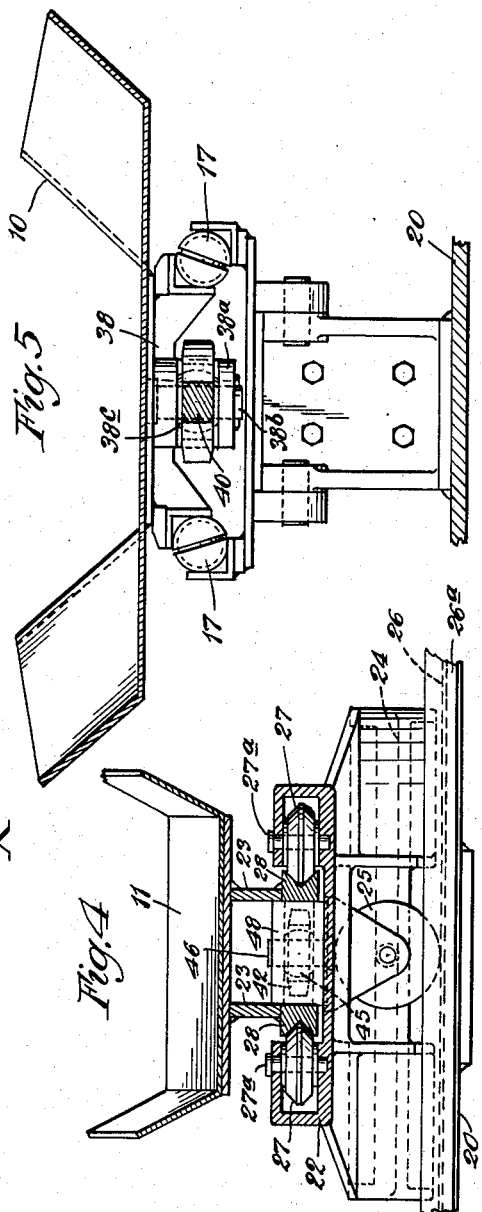
Inventor
Ernst R. Bergmann
by Murray G. Gleeson
Attorney Dec. 8, 1953     E. R. BERGMANN     2,661,834
SHAKER CONVEYER
Filed June 9, 1951     3 Sheets-Sheet 3
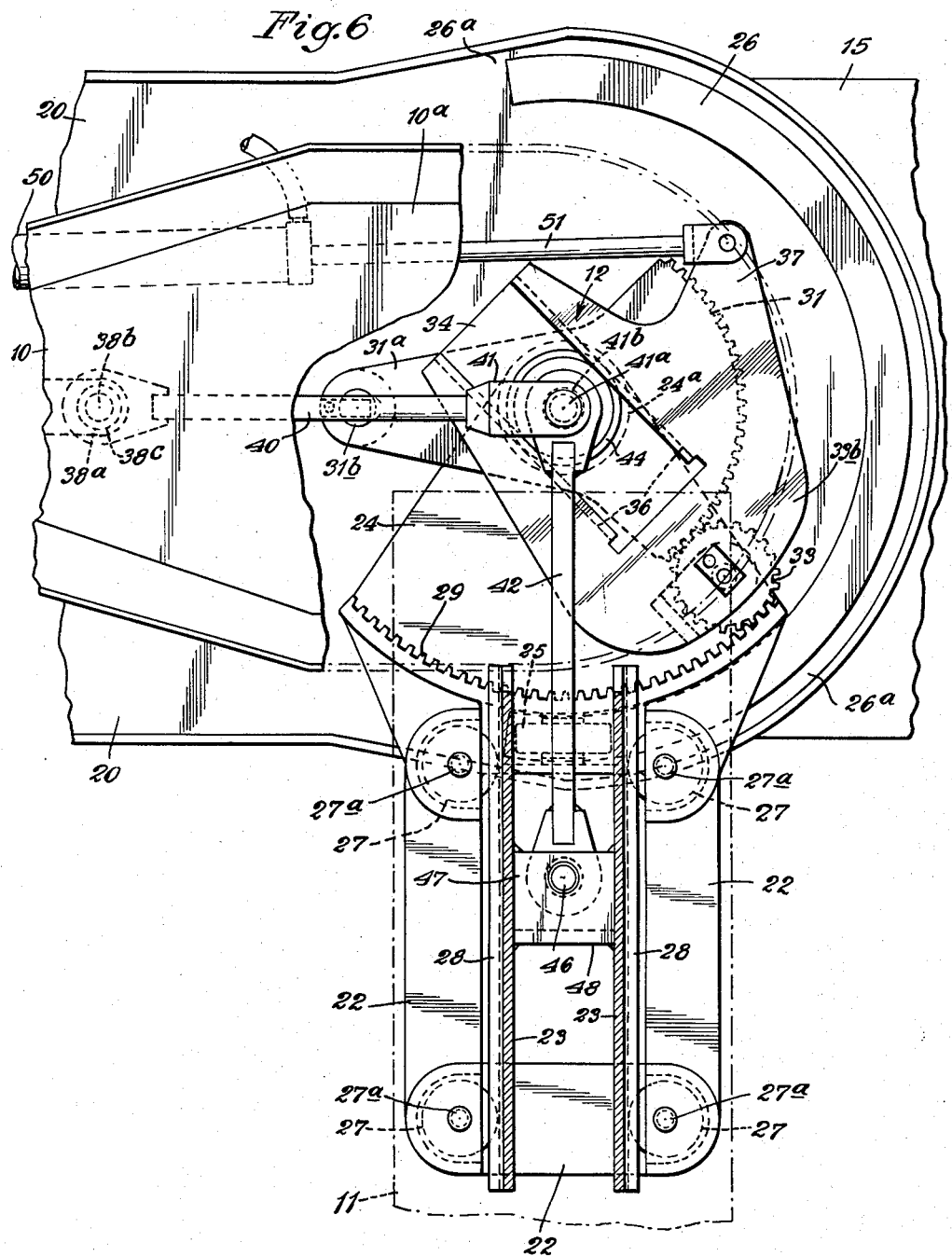
Inventor
Ernst R. Bergmann
by Murray A. Gleeson
Attorney Patented Dec. 8, 1953

2,661,834

UNITED STATES PATENT OFFICE 2,661,834

SHAKER CONVEYER

Ernst R. Bergmann, Evergreen Park, Ill., assignor to Goodman Manufacturing Company, Chicago, Ill., a corporation of Illinois Application June 9, 1951, Serial No. 230,749

9 Claims. (Cl. 198—220)

This invention relates to improvements in articulated connections for shaker conveyors and has for its principal object to provide an improved form of articulated connection or swivel in a shaker conveyor trough line permitting one portion of the trough line to be horizontally moved or swung at varying angles to an adjacent portion of the trough line while preserving an efficient reciprocable driving connection between the two trough portions in all permissible relative positions thereof.

A further object of the invention is to provide an articulated connection of the character above described capable of permitting a horizontal swinging adjustment of as much as 180 degrees between the two connected trough portions, and maintaining substantially the same shaking action of both portions in all positions of adjustment thereof.

The invention is especially adapted for use in shaker conveyors having reciprocably-actuated material-gathering means on the inby end thereof, but is not limited to such use.

The invention may best be understood by reference to the accompanying drawings, in which:

Figure 3 is an enlarged detailed section taken on line 3—3 of Figure 2;

Figure 4 is a detailed section taken on line 4—4 of Figure 3;

Figure 5 is a detailed section taken on line 5—5 of Figure 1;

Figure 6 is an enlarged fragmentary detail in plan view of the articulated connection, with parts broken away to show certain details of construction.

Figure 1:
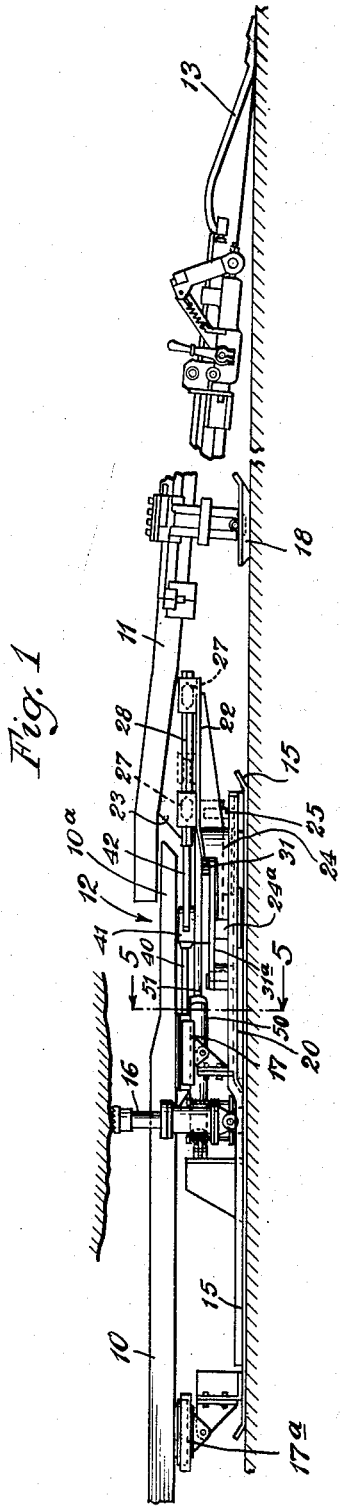
Figure 1 is a view in side elevation of a shaker conveyor installed in a mine, with parts of the loading section broken away.
Figure 2:
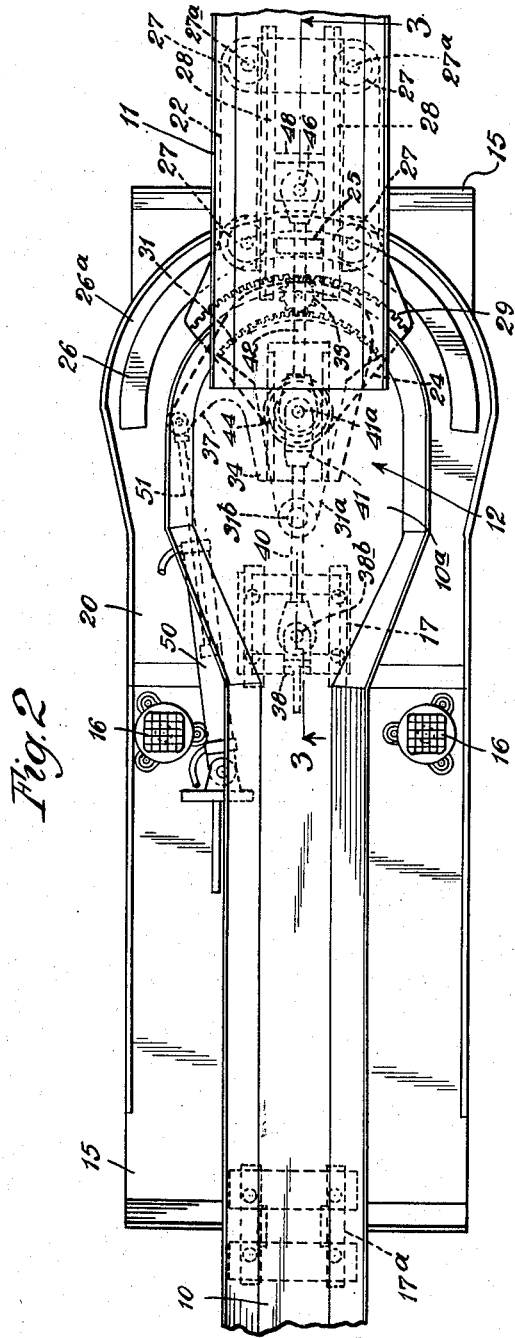
Figure 2 is an enlarged detailed plan view of the main parts of the articulated connection shown in Figure 1.

Referring now to details of the invention illustrated in the drawings, the novel articulated trough connection is shown as applied to a shaker trough line of the type commonly employed in mines, consisting of a main trough 10 and an auxiliary trough 11 adapted for relative horizontal swinging movement at the articulated trough connection, indicated generally at 12. The auxiliary trough 11 may have a conventional duckbill or material gathering device 13 at its inby end. The main trough may be actuated for reciprocable shaker action as usual by a shaker drive (not shown).

The articulated trough connection 12 includes a main frame 20 adapted to be disposed at any desired location but, when the shaker conveyor is in operation, the main frame 20 is suitably fixed against lateral movement relative to the mine floor. In the form shown herein, said main frame 20 is mounted on a skid 15 adapted to be anchored to the mine floor by jacks 16. It will be understood, however, that the main frame 20 might also be mounted on crawler treads or rollers for transportation from place to place.

The main trough 10 is mounted for reciprocal motion on the main frame 20 in any conventional manner as by one or more ball or roller frames. In the form shown, a ball frame 17 is pivotally mounted on the main frame, while the skid 15 is extended to support a second pivoted ball frame 17a in longitudinally spaced relation to the first ball frame 17. The remainder of the main trough 10 may also be supported for reciprocal motion on similar ball or roller frames (not shown) suitably mounted on the ground.

In the form shown herein, the auxiliary trough is relatively short and has the duckbill gathering mechanism 13 connected thereto, with a skid support 18 slidably connected, as usual, to said auxiliary trough 11. Further details of construction of the duckbill gathering mechanism need not be described herein as it forms no part of the present invention.

The main frame 20 is elongated in the direction of the main trough line 10 and has an upright hollow pivot pin 21 mounted adjacent its forward end. A first pivotal frame 22 has a rearwardly projecting arm 24 with a bearing 24a pivoted about the pin 21 for lateral swinging movement on an axis X—X. The frame 22 carries a roller 25 rotatable on a horizontal axis which runs along an arcuate supporting track 26 on a platform 26a extending from the front end of the main frame.

The auxiliary trough 11 has a support bracket 23 beneath its rear end. Said trough and bracket are mounted for reciprocal movement longitudinally of the first pivotal frame 22. For this purpose, two pairs of rollers 27, 27 are rotatable about individual vertical pivot pins 27a, 27a in longitudinally spaced relation along said first pivotal frame. The peripheries of rollers 27 engage in opposed V-shaped guide blocks 28, 28 depending from the support bracket 23.

As will be seen in Figure 3, the end of the auxiliary trough 11 rearwardly of the support bracket 23 extends upwardly above the level of the flared front end portion 10a of the main trough 10 at a point substantially coincident with the main axis X—X about which the first pivotal frame 22 and auxiliary trough 11 are swingable, so that material will be discharged in cascade relation from the rear end of trough 11 to the front end of trough 10 in all permissible positions of relative swinging movement thereof.

The first pivotal frame 22 has a toothed rack 29 intermediate its ends, herein said rack being formed rearwardly of the supporting roller 25 and generated concentric with the pivotal bearing 24a of said pivotal frame. An opposed toothed rack 31 is fixed on the main frame 20, said rack being generated concentric with the pivotal pin 21 on the main frame, so that it is in concentric relation with the movable rack portion 29 on the pivotal frame 22 but in horizontally spaced relation therefrom. In the form shown herein, the stationary rack 31 is carried on a plate 31a detachably secured as by stud 31b to the main frame 20 rearwardly of the pivot pin 21.

The pinion 33 is interposed between and meshed with the movable rack portion 29 of the first pivotal frame 22 and the stationary rack 31 on the main frame. Said pinion is rotatably mounted on a depending stub shaft 33a carried on a forwardly projecting arm 33b of a second pivotal frame 34. The second pivotal frame consists of a generally elongated plate-like member, and is also mounted for rotation about the axis X—X of the main frame. In the form shown herein, the pivotal mounting for the second pivotal frame consists of a depending stud 34a rotatably seated in the hollow upright pin 21. Thus, the first pivotal frame 22 and the second pivotal frame 34 are rotatable about the common axis X—X.

The second pivotal frame 34 is also provided with a laterally extending arm 37 to which is pivotally connected a power swing mechanism, as will hereinafter be more fully described.

Drive linkage is provided for connecting the main trough 10 to the auxiliary trough 11 for reciprocating motion. The main trough 10 has a bracket 38 fixed to its under side at a point substantially rearwardly of the pivotal axis X—X of the main frame. Said bracket is guided for longitudinal reciprocation relative to the main frame on ball frame 17 (see Figure 1). The bracket 38 has a clevis 38a having pivot pin 38b with a convexly formed bearing member 38c thereon, to which one end of a link 40 is pivoted. The link 40 has a clevis 41 at its forward end having a pivot pin 41a with a convexly formed bearing member 41b thereon, to which a second link 42 is pivoted. The clevis 41 also has a depending stud 43 concentric with the axis of the pivot pin 41a. A guide roller 44 is rotatably mounted on the stud 43 as by an antifriction bearing 44a. The periphery of the guide roller 44 is V-shaped so as to engage in longitudinal rolling engagement between the V-shaped guide grooves 36 in the second pivotal frame 34. Said last-named guide grooves extend longitudinally forwardly and rearwardly of, and in longitudinally centered relation with, the pivotal axis of the second frame 34.

The link 42 extends forwardly for pivotal connection at its front end on a convexly formed bearing member 45 carried on pivot pin 46 in a clevis 47. Said clevis is integral with a transverse bar 48, which herein is also integral with the opposed guide blocks 28, 28 on the auxiliary trough supporting bracket 23.

The links 40 and 42 are preferably of the same effective length to provide an articulated drive connection between the reciprocating main trough 10 and the auxiliary trough 11 for insuring substantially the same shaking action of both troughs in all positions of permissible relative movement thereof.

Due to the provision of the geared connection between the rack 29 on the first pivotal frame and the opposed rack 31 on the main frame 20 through pinion 33, which is carried on the second pivotal frame 34 as above described, it will be understood that any swinging movement of the first pivotal frame, which carries the auxiliary trough 11, will result in a corresponding swinging movement of the second pivotal frame through an angle of substantially one-half the angle of movement of the first pivotal frame.

The guide grooves 36, 36 on the second pivotal frame 34, between which intermediate guide roller 44 at the juncture of links 40 and 42 is guided, will therefore automatically assume an intermediate angular position one-half of any angle through which the first pivotal frame may be swung.

In the form of invention illustrated herein, the first pivotal frame 22 is supported for swinging movement on the track 26 carried by the main frame through an angle of 180 degrees, but the opposed toothed racks 29 and 31 on the first pivotal frame and the main frame extend only through an intermediate angle of approximately 90 degrees; that is to say, an angle of about 45 degrees on each side of the longitudinal axis of the main trough.

Any suitable means may be provided for swinging or adjusting the auxiliary trough laterally to a desired angular position relative to the main trough. In the form of apparatus disclosed herein, this swinging movement is accomplished by power means including a hydraulic cylinder 50 having its rear end pivotally connected to the main frame 20 at a point substantially rearwardly of the axis of swinging movement of the auxiliary trough and toward one side of said main frame. A piston rod 51 of the hydraulic cylinder is pivotally connected at its front end to the laterally extending arm 37 of the second pivotal frame 34. Hydraulic power may be supplied through any suitable control device to opposite ends of the hydraulic cylinder to swing the second pivotal frame 34 laterally about axis X—X.

The use and operation of the apparatus above described is as follows:

The main frame 20 may be suitably secured against lateral and longitudinal displacement at any suitable point where the conveyor trough is to be used. In the form of apparatus shown herein, the main frame may be jacked down to the mine floor as by hydraulic jacks 19 at opposite sides of said frame.

When the auxiliary trough 11 and the first pivotal frame 22, on which it is mounted, are in longitudinal alignment with the main trough 10, reciprocal motion of the main trough will be directly transmitted to the auxiliary trough through the links 40 and 42, which are then disposed in longitudinal alignment with each other and with both of said troughs. The articulated joint between the two links is guided by roller 44 along the same longitudinal path between the guide grooves 36 of the second pivotal frame 34. The auxiliary trough 11 may be swung laterally in either direction relative to the main frame as by actuating the hydraulic cylinder 50, to swing the second pivotal frame 34 about axis X—X. This will cause the pinion 33 on the second pivotal frame 34 to work around the stationary rack 31 on the main frame 20. This, in turn, causes the movable rack 29, together with the first pivotal frame 22, to swing through an arc twice that of the second pivotal frame 34, carrying the auxiliary trough 11 therewith. Thus, should the second pivotal frame 34 be swung 45 degrees from its central position in longitudinal alignment with the main trough 10 through an arc of 45 degrees to either side of said central position, the first pivotal frame 22 and the auxiliary trough 11 will be swung through an arc of 90 degrees in the same direction. Conversely, swinging of the first pivotal frame 22 90 degrees in one direction will cause the second pivotal frame 34 to swing half that amount in the same direction. Since the guide grooves 36 for the articulated joint between drive links 40 and 42 swings with the second pivotal frame 34, it will be seen that said guide grooves will be automatically swung one-half the angle of swing of the first pivotal frame 22, in response to any swinging movement of the latter.

Although the auxiliary trough 11 can also be swung or adjusted laterally by inching or prying it with a crowbar or by means of a draft cable connected to a hoist, the power swinging means including hydraulic cylinder 50 is especially effective and convenient for swinging the auxiliary trough, particularly in the novel arrangement disclosed herein, wherein the piston and cylinder act between the main frame 20 and the second pivotal frame 34 rather than between the main frame and the first pivotal frame 22. Since the second pivotal frame 34 swings through half of the arc of the first pivotal frame 22, it is only necessary to provide a hydraulic cylinder of one-half the effective length of that which would be required if the hydraulic cylinder is connected directly to the first pivotal frame 22.

I claim:

1. An articulated connection for a shaker conveyor comprising a base having two troughs mounted thereon and reciprocable along independent longitudinal axes, one of said troughs being swingable relative to the other trough, an articulated driving linkage swingable independently of said trough and having pivotal connections centrally of and beneath said troughs and a pivotal joint intermediate said connections, guide means effective to restrain movement of said joint back and forth along a rectilinear axis, said guide means being swingably mounted on said base, and means for swinging said guide means in the direction of swing of the swingable trough responsive to swinging movement of the latter, to maintain a predetermined angular relationship between the rectilinear axis of said guide means and the longitudinal axes of said troughs, whereby to facilitate driving of one trough by the other through said linkage.

2. An articulated connection for a shaker conveyor comprising a main frame having two reciprocable troughs mounted thereon, one of said troughs being swingable relative to the other trough on a fixed upright axis, an articulated linkage swingable independently of said troughs and having pivotal connections centrally of and beneath said troughs and having a pivotal joint intermediate said connections, guide means swingably mounted on said main frame about a vertical axis substantially coincident with the fixed axis of swinging movement of said troughs, and engageable with said joint effective to restrain movement thereof along a rectilinear axis, and means operable in response to swinging movement of said swingable trough to pivot said guide means in a direction to maintain substantially similar angular relationship between the axis of said guide means and the longitudinal axes of said troughs.

3. An articulated connection for a shaker conveyor comprising a main frame, a main trough reciprocably mounted on said main frame, an auxiliary trough swingable about an axis on said main frame, a first pivotal frame mounted on said main frame for swinging movement about said axis and having said auxiliary trough reciprocably mounted thereon, a movable rack carried by said first pivotal frame, a stationary rack carried by said main frame, a pinion interposed between said racks, a second pivotal frame mounted on said main frame for swinging movement about said axis and having said pinion rotatably mounted therein, guide means on said second pivotal frame, and means for transmitting reciprocatory movement from one trough to the other including an articulated linkage extending from one trough to the other through said guide means and guided by the latter.

4. An articulated connection for shaker conveyors according to claim 3, having motor means acting between the main frame and the second pivotal frame for swinging said auxiliary trough relative to the main trough.

5. An articulated connection for shaker conveyors according to claim 3, in which the main frame is provided with an arcuately extending support and anti-friction means is provided acting between the first pivotal frame and said support.

6. An articulated connection for shaker conveyors according to claim 3, in which the two racks are circular and concentric with said axis.

7. An articulated connection for shaker conveyors according to claim 3, in which the guide means on the second pivotal frame is elongated and embraces a portion of the linkage for movement in a straight reciprocable path.

8. An articulated connection for shaker conveyors according to claim 3, in which the guide means on the second pivotal frame includes a longitudinal slot having an antifriction roller guidably embraced therein, and the articulated linkage includes a pair of links connected respectively between said roller and each of said troughs.

9. An articulated connection for shaker conveyors in accordance with claim 3, in which the articulated linkage includes a pair of links each pivotally connected to one of said troughs and interconnected with one another at a pivotal joint, and guide means is provided which is carried by the second pivotal frame and is effective to guide said joint for reciprocation in a rectilinear path.

ERNST R. BERGMANN.

References Cited in the file of this patent

UNITED STATES PATENTS

| Number | Name | Date |
|---|---|---|
| 2,129,809 | Bergmann | Sept. 13, 1938 |
| 2,232,650 | Bergmann | Feb. 18, 1941 |